(12) United States Patent
Hatano et al.

(10) Patent No.: US 11,458,640 B2
(45) Date of Patent: *Oct. 4, 2022

(54) GRIPPING DEVICE AND INDUSTRIAL ROBOT

(71) Applicant: NITTA CORPORATION, Osaka (JP)

(72) Inventors: Itaru Hatano, Yamatokoriyama (JP); Hirokazu Nitta, Yamatokoriyama (JP)

(73) Assignee: NITTA CORPORATION, Osaka (JP)

( * ) Notice: Subject to any disclaimer, the term of this patent is extended or adjusted under 35 U.S.C. 154(b) by 124 days.

This patent is subject to a terminal disclaimer.

(21) Appl. No.: 16/970,373

(22) PCT Filed: Feb. 14, 2019

(86) PCT No.: PCT/JP2019/005383
§ 371 (c)(1),
(2) Date: Aug. 16, 2020

(87) PCT Pub. No.: WO2019/167654
PCT Pub. Date: Sep. 6, 2019

(65) Prior Publication Data
US 2020/0406478 A1    Dec. 31, 2020

(30) Foreign Application Priority Data

Feb. 27, 2018    (JP) .............................. JP2018-033714

(51) Int. Cl.
*B25J 15/10*    (2006.01)
*B25J 15/12*    (2006.01)

(52) U.S. Cl.
CPC .............. *B25J 15/10* (2013.01); *B25J 15/12* (2013.01)

(58) Field of Classification Search
CPC . B25J 15/10; B25J 15/12; B25J 15/024; B25J 9/0009
See application file for complete search history.

(56) References Cited

U.S. PATENT DOCUMENTS 4,671,553 A * 6/1987 Bertini ................... B25B 5/061
294/196
4,699,414 A * 10/1987 Jones ..................... B25J 15/026
294/902
(Continued)

FOREIGN PATENT DOCUMENTS

DE        4240814 A1    6/1994
DE    102012001326 A1    7/2013
(Continued)

OTHER PUBLICATIONS

Extended European search report for the corresponding European Patent Application No. 19760677.5 dated Nov. 5, 2021.

*Primary Examiner* — Stephen A Vu
(74) *Attorney, Agent, or Firm* — Muncy, Geissler, Olds & Lowe, P.C.

(57) ABSTRACT

A gripping device includes: a palm portion; a plurality of finger portions protruding from a periphery of the palm portion and configured to fall toward the palm portion by deforming the palm portion in a thickness direction; a connecting portion formed in a position surrounding an outer edge of the palm portion on a side opposite to a side formed with the finger portions, the connecting portion connected to a case; a high-strength portion provided between the palm portion and the connecting portion, the high-strength portion having a predetermined length from the outer edge of the palm portion in the thickness direction of the palm portion, and the high-strength portion being less likely to be deformed than the palm portion; the case connected to the connecting portion, the case coming into contact with a base end of the high-strength portion; and an actuator configured to deform the palm portion.

5 Claims, 12 Drawing Sheets

(56) References Cited

U.S. PATENT DOCUMENTS

| | | | |
|---|---|---|---|
| 4,768,428 A * | 9/1988 | Silvestrini | A23N 4/04 294/99.1 |
| 7,012,491 B1 | 3/2006 | Geisberger et al. | |
| 2011/0098859 A1 | 4/2011 | Irie | |
| 2012/0025553 A1* | 2/2012 | Fischer | B25J 15/103 294/198 |
| 2015/0360372 A1* | 12/2015 | Schiettecatte | B25J 15/0023 156/60 |

FOREIGN PATENT DOCUMENTS

| | | | |
|---|---|---|---|
| JP | 2011115930 A | 6/2011 |
| JP | 6066585 A | 1/2017 |
| JP | 2017185553 A | 10/2017 |

\* cited by examiner

GRIPPING DEVICE AND INDUSTRIAL ROBOT

TECHNICAL FIELD

The present invention relates to a gripping device and an industrial robot.

BACKGROUND ART

As a gripping device for gripping a workpiece, a gripping device is disclosed that includes a bag-shaped gripping body including a palm portion, a plurality of finger portions protruding from a periphery of the palm portion and configured to fall toward the palm portion by deforming the palm portion in a thickness direction, and a granular material held in the gripping body (Patent Literature 1). The gripping device reduces pressure in the gripping body to deform the palm portion in the thickness direction and elastically deform the finger portions to fall toward the palm portion. Since including the plurality of finger portions, the gripping device can versatilely grip workpieces of different sizes or shapes. The gripping device can grip a workpiece merely by reducing pressure in the gripping body and thus can be simply controlled. Also, there is no need to press the gripping body hard against a workpiece, and thus a soft workpiece such as food can be gripped without being damaged.

CITATION LIST

Patent Literature

Patent Literature 1: Japanese Patent Laid-Open No. 2017-185553

SUMMARY OF INVENTION

Technical Problem

However, if the gripping body of the gripping device in Patent Literature 1 bursts due to deterioration, breakage, or the like, the granular material filling the gripping body scatters and contaminates the workpiece. This is a problem. The granular material is deteriorated by density changes due to jamming transition, and cannot be stably used. This is a problem.

An object of the present invention is to provide a gripping device and an industrial robot that can more reliably grip a workpiece without using a granular material.

Solution to Problem

A gripping device according to the present invention includes: a palm portion; a plurality of finger portions protruding from a periphery of the palm portion and configured to fall toward the palm portion by deforming the palm portion in a thickness direction; a connecting portion formed in a position surrounding an outer edge of the palm portion on a side opposite to a side formed with the finger portions, the connecting portion connected to a case; a high-strength portion provided between the palm portion and the connecting portion, the high-strength portion having a predetermined length from the outer edge of the palm portion in the thickness direction of the palm portion, and the high-strength portion being less likely to be deformed than the palm portion; the case connected to the connecting portion, the case coming into contact with a base end of the high-strength portion; and an actuator configured to deform the palm portion in the thickness direction.

An industrial robot according to the present invention includes the gripping device.

Advantageous Effects of Invention

According to the present invention, the high-strength portion prevents contraction of an outer periphery of the palm portion, and thus the palm portion is deformed in the thickness direction to deform the finger portions toward the palm portion, thereby gripping a workpiece. Thus, the workpiece can be more reliably gripped without using a granular material.

DESCRIPTION OF EMBODIMENTS

Figure 1:
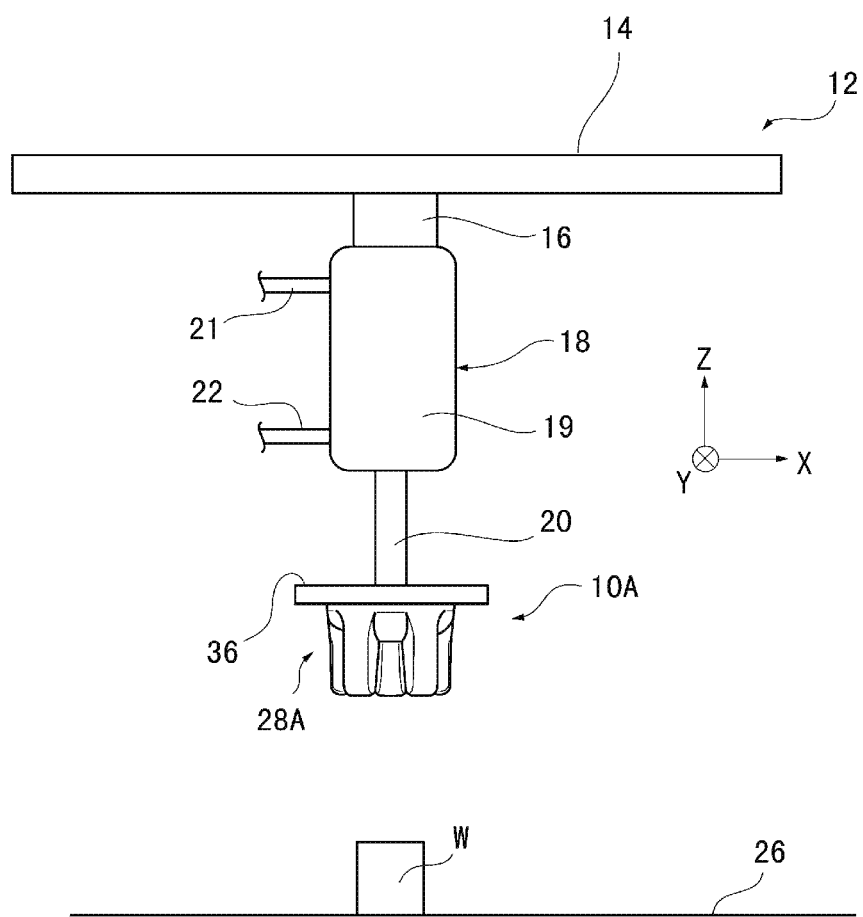
FIG. 1 is a schematic view of an example of an industrial robot to which a gripping device according to the embodiment is applied.

A gripping device according to the present invention includes: a palm portion; a plurality of finger portions protruding from a periphery of the palm portion and configured to fall toward the palm portion by deforming the palm portion in a thickness direction; a connecting portion formed in a position surrounding an outer edge of the palm portion on a side opposite to a side formed with the finger portions, the connecting portion connected to a case; a high-strength portion provided between the palm portion and the connecting portion, the high-strength portion having a predetermined length from the outer edge of the palm portion in the thickness direction of the palm portion, and the high-strength portion being less likely to be deformed than the palm portion; the case connected to the connecting portion, the case coming into contact with a base end of the high-strength portion; and an actuator configured to deform the palm portion in the thickness direction.

The high-strength portion is less likely to be deformed than the palm portion, and thus when an inner surface of the palm portion is pulled up, the palm portion is deformed in the thickness direction without its outer periphery contracting. Thus, the finger portions of a gripping body are elastically deformed to fall toward the palm portion, and thus the gripping body can more reliably grip a workpiece without using a granular material.

The high-strength portion is formed to have higher mechanical strength than the palm portion. The high-strength portion may be separate from or integral with the palm portion, the finger portions, and the connecting portion.

When the high-strength portion is integral with the palm portion, the finger portions, and the connecting portion, the high-strength portion may be uniformly or partially provided around the palm portion. Specifically, the high-strength portion may be thicker than the palm portion. In this case, the high-strength portion may be uniformly or partially thick. When being partially thick, the high-strength portion may be partially thick in a circumferential direction of the palm portion or in a direction parallel to the thickness direction of the palm portion. The high-strength portion may be made of a material having higher mechanical strength than a material of the palm portion. The material having high mechanical strength may include a material of the same nature as the material of the palm portion but having higher hardness, a material different from the material of the palm portion, a material containing an additive such as a filler, or a composite thereof. A base end of the high-strength portion comes into contact with a part of the case. The base end of the high-strength portion may come into surface contact or line contact with the case. The base end preferably has a contact surface coming into contact with the case. When the case includes an upper case and a lower case, the upper case may come into contact with the contact surface or the lower case may come into contact with the contact surface. The high-strength portion is a certain region from the base end to a distal end connected to the palm portion. The distal end is a boundary between the high-strength portion and the palm portion, but cannot be always clearly visually recognized. The distal end preferably serves as a fulcrum when the palm portion is deformed in the thickness direction.

The actuator may use pressure or electric power as a power source. The pressure may include oil pressure, air pressure, water pressure, and the like. The electric power includes a mechanism using a motor and a mechanism using an electromagnet. The actuator includes a mechanism mechanically connected to the palm portion and a mechanism that needs not be mechanically connected to the palm portion.

Now, with reference to drawings, embodiments of the present invention will be described in detail.

1. First Embodiment (Overall Configuration)

FIG. 1 shows a configuration of an industrial robot 12 to which a gripping device 10A according to the embodiment is applied. The industrial robot 12 is an orthogonal robot and includes a rail 14, a moving body 16 that moves along the rail 14, and a first power cylinder 18 secured to the moving body 16. The rail 14 is provided movably in a Y-axis direction in FIG. 1.

The first power cylinder 18 includes a first cylinder tube 19 and a first piston rod 20 provided to be advanced from and retracted into the first cylinder tube 19. The first cylinder tube 19 includes first pipes 21, 22. A gas or a liquid such as oil as a power source is supplied and exhausted through the first pipes 21, 22 to allow the first piston rod 20 to be advanced from and retracted into the first cylinder tube 19. The gripping device 10A is provided at a distal end of the first piston rod 20. A bracket which is not shown is preferably provided between the distal end of the first piston rod 20 and the gripping device 10A to prevent interference between an actuator described later and the first piston rod 20.

The industrial robot 12 can grip a workpiece W placed on a horizontal base 26 with the gripping device 10A and move the workpiece W in X-axis, Y-axis, and Z-axis directions.

The gripping device 10A includes a case 36 coupled to the first piston rod 20 and a gripping body 28A secured to the case 36. The gripping body 28A can be made of an airtight and elastic material, for example, natural rubber, synthetic rubber, or the like. Hardness of the gripping body 28A measured according to JIS K6253: durometer hardness test (type A) is preferably about 60 to 90.

Figure 2:
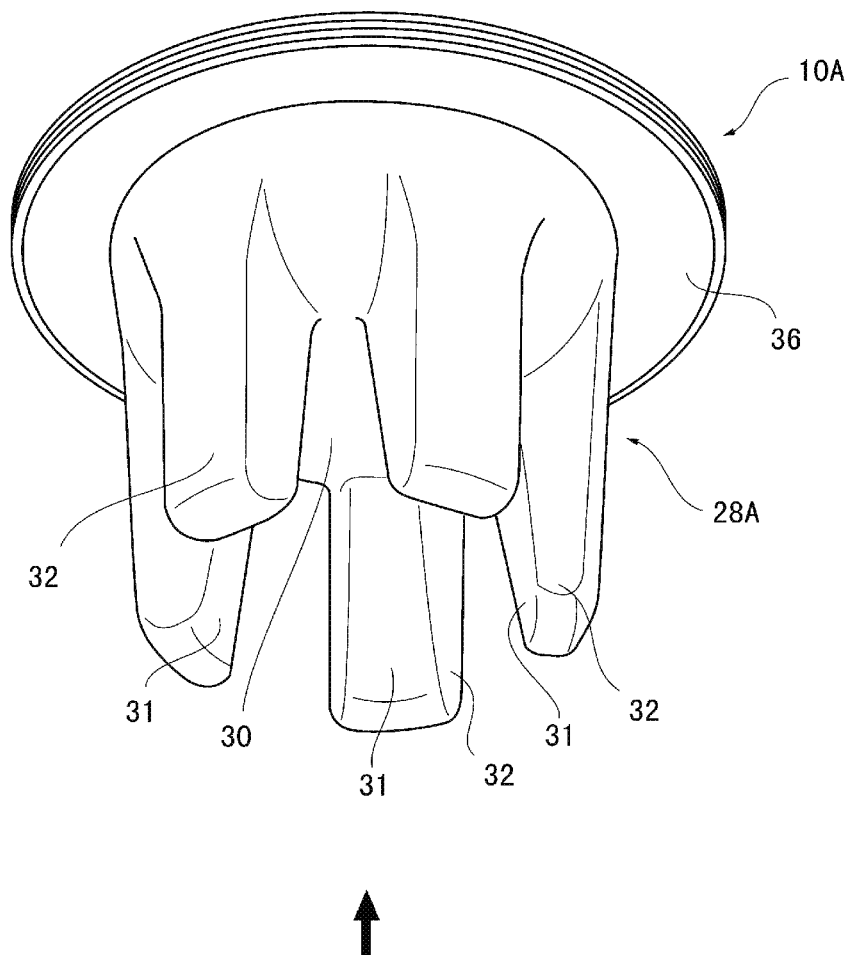
FIG. 2 is a perspective view of a configuration of the gripping device according to the embodiment.

As shown in FIG. 2, the gripping body 28A includes a palm portion 30 and a plurality of finger portions 32 provided to protrude from a periphery of the palm portion 30. The palm portion 30 has a substantially disk shape. Five finger portions 32 are radially provided and integrated with the palm portion 30 so as to surround the palm portion 30. A predetermined interval is formed between the finger portions 32. Inner surfaces 31 of the finger portions 32 are integrated with the palm portion 30. Each of the finger portions 32 may have any outer shape, for example, a cylindrical shape, a conical shape, a truncated conical shape, a triangular prism shape, a square prism shape, a triangular pyramid shape, a square pyramid shape, a truncated square pyramid shape, or the like. In the embodiment, the finger portions 32 have the same shape. The plurality of finger portions 32 need not all have the same shape but may have different shapes. Each of the finger portions 32 has a truncated square pyramid shape, and each of the inner surfaces 31 is formed to be inclined outward from a base end continuous with the palm portion 30 toward a distal end.

Figure 3:
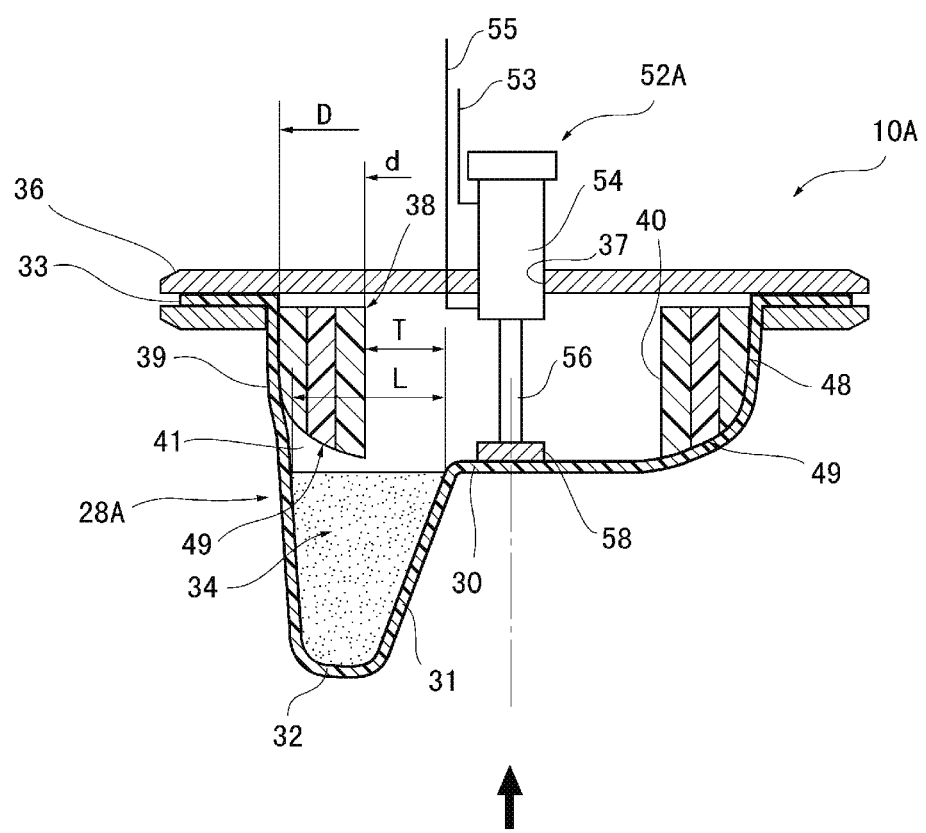
FIG. 3 is a partial end view of the configuration of the gripping device according to the embodiment.

As shown in FIG. 3, the gripping body 28A is a bag-shaped member having a circular opening on the side opposite to the side formed with the palm portion 30 and the finger portions 32. The gripping body 28A includes therein elastic portions 34, a high-strength portion 38, and a second power cylinder 52A as an actuator. The gripping body 28A is secured to the case 36 at a flange portion 33 as a connecting portion integrated with a peripheral edge of the opening, and the case 36 closes the opening. The gripping body 28A has an outer peripheral surface 39 curved to protrude outward from the palm portion 30 toward the flange portion 33.

A through hole 37 is provided at the center of the case 36. The second power cylinder 52A is secured in the through hole 37. The second power cylinder 52A includes a second cylinder tube 54 and a second piston rod 56 provided to be advanced from and retracted into the second cylinder tube 54. The second cylinder tube 54 includes second pipes 53, 55. A gas or a liquid such as oil as a power source is supplied and exhausted through the second pipes 53, 55 to allow the second piston rod 56 to be advanced from and retracted into the second cylinder tube 54. A distal end of the second piston rod 56 is connected to a support plate 58 secured to a back surface of the palm portion 30.

Each of the elastic portions 34 fills each of the finger portions 32 and has the shape of the finger portion 32. As long as the elastic portion 34 is inserted into the finger portion 32 of the gripping body 28A and can hold a certain shape, a slight gap may be created from the inner surface of the finger portion 32. A material of the elastic portion 34 is preferably resin or rubber. The material of the elastic portion 34 needs not be always uniform but may be a composite of different materials. The elastic portion 34 may contain an additive such as a filler. The elastic portion 34 is preferably arranged without a gap from the inner surface of the finger portion 32. If the elastic portions 34 fill most of the gripping body 28A beyond the palm portion 30, the palm portion 30 is not deformed in the thickness direction, thereby preventing the finger portions 32 from being elastically deformed toward the center of the palm portion 30. Thus, the elastic portions 34 are preferably arranged in the finger portions 32.

The high-strength portion 38 is arranged in an internal space of the palm portion 30 of the gripping body 28A. The high-strength portion 38 holds the gripping body 28A so that a part other than the palm portion 30, that is, an outer periphery of the palm portion 30 is not contracted. A material of the high-strength portion 38 may be one that is not deformed when the gripping body 28A is deformed, and may be, for example, hard resin or metal. The material of the high-strength portion 38 needs not be always uniform but may be a composite of different materials.

The high-strength portion 38 in FIG. 3 is a frame-shaped member including a guide hole 40 that receives the deformed palm portion 30, and a curved portion 49 provided on an outer side at a distal end on the side of the finger portions 32 in an axial direction of the guide hole 40. In the embodiment, the high-strength portion 38 is a cylindrical member having a holding surface 48 that holds an outer peripheral surface 39 of the palm portion 30. It is preferable that the guide hole 40 is provided at the center of the high-strength portion 38 corresponding to the palm portion 30, and an inner diameter of the guide hole 40 is substantially equal to the size of the palm portion 30. The holding surface 48 is a circumferential surface on the outer side of the high-strength portion 38, has a size to hold the outer peripheral surface 39 of the palm portion 30, and is generally tapered toward the distal end. The curved portion 49 is provided in the holding surface 48 on the side of the finger portions 32. The curved portion 49 protrudes outward.

Figure 4:
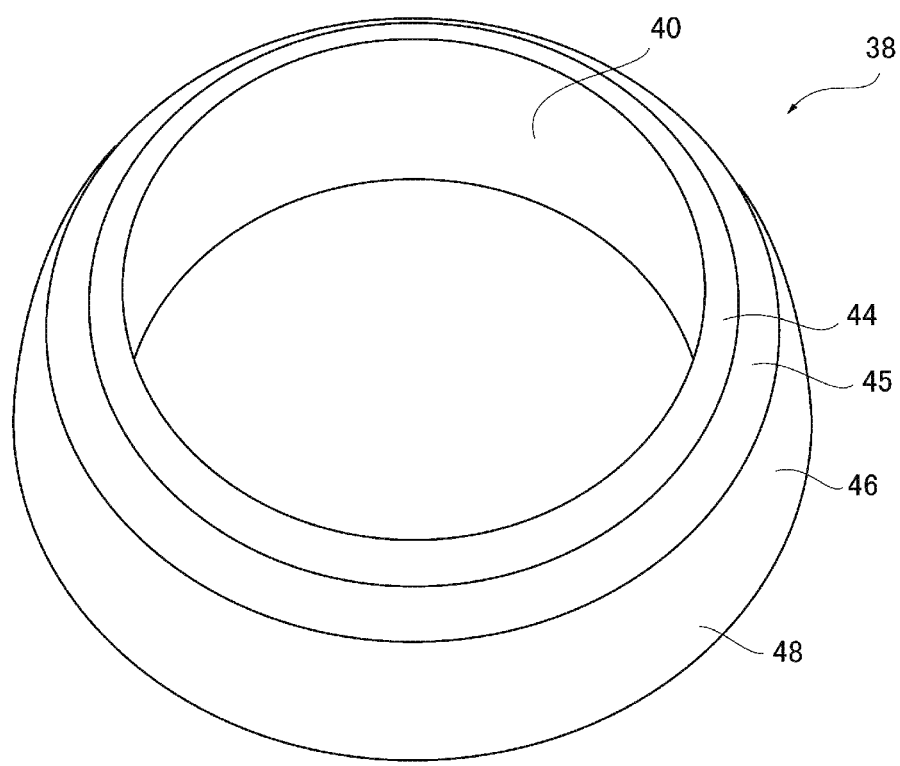
FIG. 4 is a perspective view of a configuration of a shape holding portion.

As shown in FIG. 4, the high-strength portion 38 includes a plurality of, that is, three in FIG. 4, ring bodies 44 to 46 concentrically arranged. The ring bodies 44 to 46 are axially movable and removable.

The distal end of the high-strength portion 38 on the side of the finger portions where the curved portion 49 and the guide hole 40 cross in a plane is preferably chamfered. For chamfering, the distal end of the high-strength portion 38 on the side of the finger portions may be cut into a corner surface or a rounded surface. Chamfering the high-strength portion 38 can prevent damage such as a chip at the distal end.

With reference to FIG. 3, the high-strength portion 38 will be described in more detail. A ratio of an outer diameter D of the high-strength portion 38 to an inner diameter d of the guide hole 40 is preferably 1.0:0.98 to 1.0:0.6. For example, when the outer diameter D of the high-strength portion 38 is 80 mm, the inner diameter d in the range of 48 to 78 mm allows the finger portion 32 to be more reliably elastically deformed toward the center of the palm portion 30.

Further, the distal end of the high-strength portion 38 on the side of the finger portions is preferably located on a radially outer side of a center position of a base end of each elastic portion 34 in a plan view. Specifically, when a radial length of the elastic portion 34 is L, the distal end of the high-strength portion 38 on the side of the finger portions preferably comes into contact with the base end of the elastic portion 34 at a distance T of L/2 or longer from an inner side of the elastic portion 34. When the distal end of the high-strength portion 38 on the side of the finger portions comes into contact with the base end of the elastic portion 34 on a radially inner side of the center position of the elastic portion 34 (when T is shorter than L/2), the finger portions 32 are prevented from being elastically deformed toward the center of the palm portion 30.

(Operation and Effect)

Operation and effect of the industrial robot 12 including the gripping device 10A configured as described above will be described. At a starting point of the industrial robot 12, the first piston rod 20 is retracted in the first cylinder tube 19, and the first power cylinder 18 is contracted. In an initial state, the second piston rod 56 of the second power cylinder 52A is advanced from the second cylinder tube 54 and extended.

In the industrial robot 12, the moving body 16 is moved along the rail 14 to position the gripping device 10A vertically above the workpiece W placed on the base 26 (FIG. 1). Then, in the industrial robot 12, the first piston rod 20 is advanced from the first cylinder tube 19 to extend the first power cylinder 18 until the finger portions 32 reach a side surface of the workpiece W.

Figure 5:
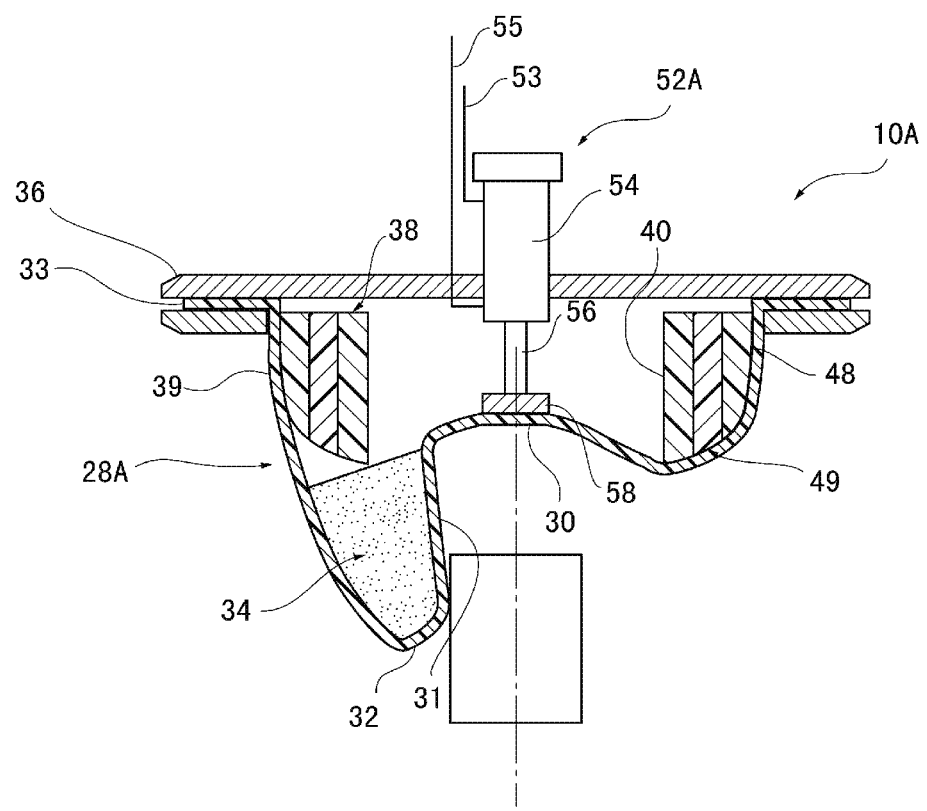
FIG. 5 is a partial end view of a use state of the gripping device according to the embodiment.

Then, the second piston rod 56 is retracted into the second cylinder tube 54 to contract the second power cylinder 52A. The high-strength portion 38 keeps holding the shape of the outer peripheral surface 39 of the palm portion 30 of the gripping body 28A. Then, the palm portion 30 is deformed in the thickness direction so as to be sucked into the guide hole 40 of the high-strength portion 38 (FIG. 5). In FIG. 5, the base end of the high-strength portion 38 is not in contact with the case 36, but actually, the deformation of the palm portion 30 causes the high-strength portion 38 to move toward the case 36, and the base end of the high-strength portion 38 comes into contact with the case 36.

As the palm portion 30 is deformed in the thickness direction, the inner surfaces 31 of the finger portions 32 are pulled toward the center of the palm portion 30. Then, the finger portions 32 are elastically deformed to fall toward the palm portion 30. Thus, the finger portions 32, mainly, the inner surfaces 31 come into contact with surfaces of the workpiece W. For the cubic workpiece W in FIG. 5, the finger portions 32 come into contact with the side surfaces of the workpiece W. As described above, the gripping device 10A contracts the second power cylinder 52A to grip the workpiece W. The gripping device 10A exerts a gripping force according to an amount of contraction of the second power cylinder 52A. Specifically, the gripping force of the gripping device 10A increases with increasing amount of contraction of the second power cylinder 52A.

Then, in the industrial robot 12, the first piston rod 20 is retracted into the first cylinder tube 19 to contract the first power cylinder 18, thereby allowing the workpiece W to be lifted from the base 26. Further, in the industrial robot 12, the moving body 16 is moved along the rail 14 or the rail 14 is moved in the Y-axis direction, thereby allowing the workpiece W to be freely moved in a horizontal direction.

After the workpiece W is moved to a desired position, the first piston rod 20 of the industrial robot 12 is advanced from the first cylinder tube 19 to extend the first power cylinder 18 until the workpiece W comes into contact with the base 26. Then, as the second piston rod 56 is advanced from the second cylinder tube 54 to extend the second power cylinder 52A, the palm portion 30 is pressed out of the guide hole 40 and returns to its original state. As the palm portion 30 returns to its original state, the finger portions 32 are opened to release the workpiece W.

Then, the first piston rod 20 of the industrial robot 12 is retracted into the first cylinder tube 19 to contract the first power cylinder 18 to separate the gripping device 10A from the workpiece W. In this manner, the industrial robot 12 can grip the workpiece W placed on the base 26 with the gripping device 10A to move the workpiece W to a desired position.

The gripping device 10A includes the elastic portions 34 each having the shape of the finger portion 32 and the high-strength portion 38 in the gripping body 28A, and thus can more reliably grip the workpiece W without using a granular material. Since the gripping device 10A does not use a granular material, the workpiece W is not contaminated even if the gripping body 28A bursts.

The elastic portion 34 has the shape of the finger portion 32, and thus fits in the finger portion 32 even if the distal end of the finger portion 32 is directed downward, sideways, or upward. Thus, the gripping device 10A can lift the workpiece W on the base 26 and also can grip the workpiece W suspended from a vertical wall surface or a ceiling. The elastic portion 34 having the shape of the finger portion 32 has higher rigidity than a granular material after jamming transition, thereby allowing the workpiece W to be more reliably gripped.

The gripping device 10A can contract the second power cylinder 52A to reliably deform the palm portion 30 in the thickness direction, thereby gripping the workpiece W. Thus, there is no need to press the gripping body 28A against the workpiece W. Thus, the gripping device 10A can grip a soft workpiece W such as food without crushing the workpiece W, thereby preventing damage to the workpiece W.

The gripping body 28A can change an amount of deformation of the finger portions 32 and a gripping force according to the amount of contraction of the second power cylinder 52A. Thus, the gripping device 10A can change the gripping force according to a size or hardness of the workpiece W, thereby improving versatility. The palm portion 30 is deformed in the thickness direction so as to be sucked into the guide hole 40, and thus the finger portions 32 are deformed at a sharper angle toward the palm portion 30. This allows the gripping device 10A to grip a smaller workpiece W.

The ring bodies 44 to 46 concentrically arranged can be removed as appropriate to change a size of the guide hole 40 and an outer size of the high-strength portion 38. Thus, the high-strength portion 38 can be adjusted by choosing the ring bodies 44 to 46 to fit the size of the outer peripheral surface 39 of the gripping body 28A or the palm portion 30, thereby improving versatility. The guide hole 40 is a hole of the innermost ring body 44 of the high-strength portion 38, and the holding surface 48 is a circumferential surface of the outermost ring body 46 of the high-strength portion 38.

The high-strength portion 38 includes the curved portion 49, and thus the palm portion 30 is deformed in the thickness direction while coming into contact with the curved portion 49, thereby continuously and gently deforming the finger portions 32. Thus, the gripping device 10A can softly grip the workpiece W. In a gripping device including a shape holding portion without a curved portion, finger portions are deformed to be buckled.

Modified Example (1) Modified Example of Actuator

In the embodiment, the actuator as the power cylinder has been described, but the present invention is not limited thereto. For example, the actuator may be a mechanism including a screw. Although not shown, one end of a screw threaded into a female thread provided in the case 36 is rotatably secured to the support plate 58, and the other end of the screw is coupled to a motor. Rotating the screw allows the palm portion 30 to be deformed in the thickness direction.

Figure 6:
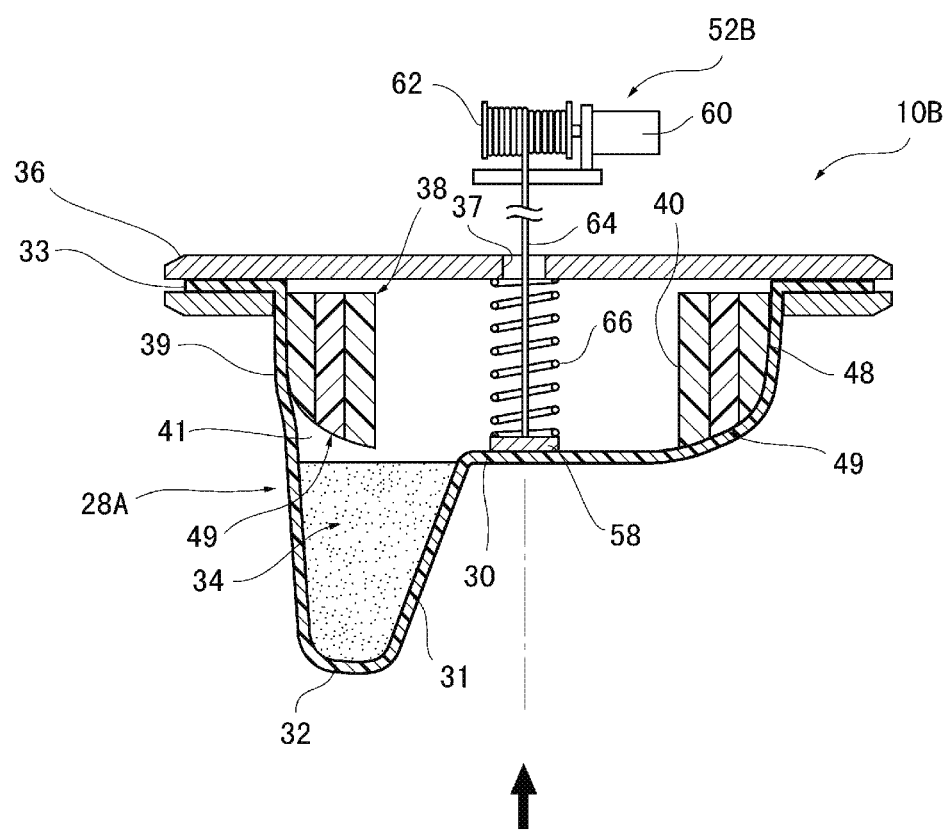
FIG. 6 is a partial end view of a configuration of a gripping device according to Modified example (1) of an actuator.
Figure 7:
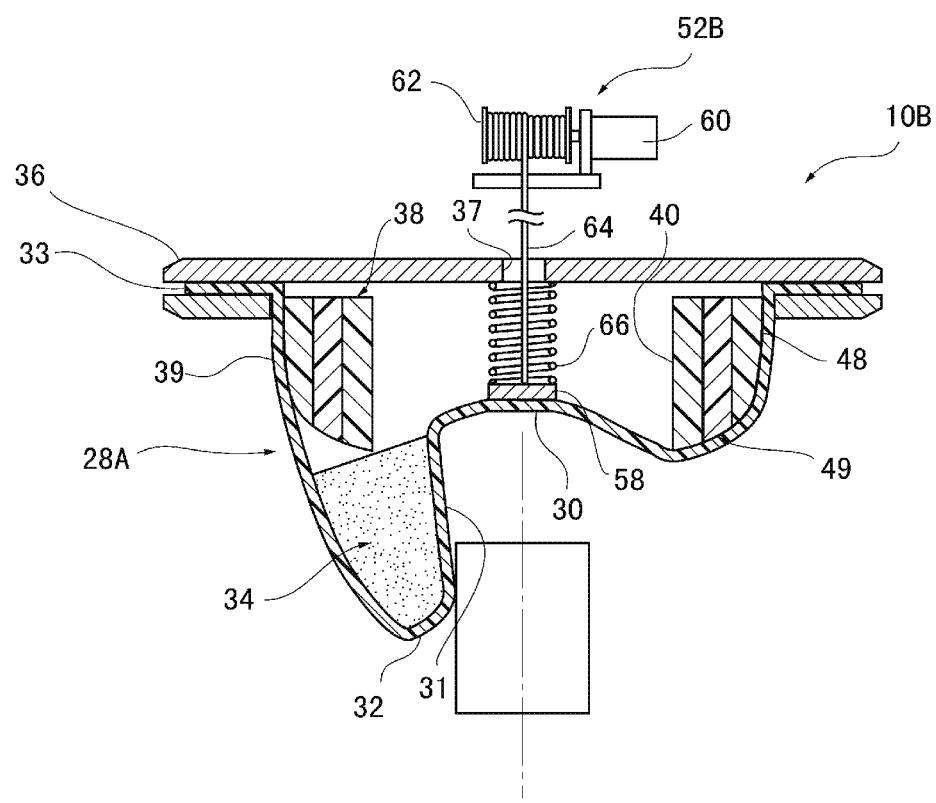
FIG. 7 is a partial end view of a use state of the gripping device according to Modified example (1) of the actuator.

A gripping device 10B in FIG. 6 includes an actuator 52B using a motor 60. The actuator 52B includes the motor 60, a spool 62 coupled to the motor 60, and a wire 64 wound around the spool 62. The motor 60 may be secured to a top of the case 36 or may be provided apart from the gripping device 10B. A distal end of the wire 64 is secured to the support plate 58 through the through hole 37 in the case 36. A coil spring 66 as an elastic body is preferably provided between the support plate 58 and the case 36. The coil spring 66 applies a force to the palm portion 30 in a direction pressing outward in the thickness direction. Positively rotating the motor 60 to wind the wire 64 around the spool 62 allows the palm portion 30 to be deformed inward in the thickness direction to close the finger portions 32 (FIG. 7). On the other hand, reversely rotating the motor 60 to unwind the wire 64 from the spool 62 allows the palm portion 30 to be deformed outward in the thickness direction to open the finger portions 32. When the palm portion 30 is deformed outward in the thickness direction, the coil spring 66 can press the palm portion 30 outward in the thickness direction, thereby more quickly opening the finger portions 32.

The mechanism using the motor 60 may include a rack and a pinion. The rack is inserted through the through hole in the case and secured at one end to the support plate, and the motor 60 rotationally drives the pinion. A rotational movement of the pinion can be converted into a linear movement of the rack, thereby deforming the palm portion 30 in the thickness direction.

The gripping device 10B may include a communication portion which is not shown using a power source for driving the motor 60. The communication portion has a wired communication function such as optical fibers, telephone lines, or Ethernet®, or a wireless communication function such as wireless LAN, Bluetooth®, or Wi-Fi®. Through the communication portion, the gripping device 10B can be remotely controlled or an operation situation of the gripping device 10B can be remotely checked. The gripping device 10B may include a load sensor or a temperature sensor which is not shown. The operation of the gripping device 10B can be controlled based on detection data obtained by the sensor.

The gripping device 10B can be operated in the field without any pressure source by using electricity as a drive source. The gripping device 10B can more easily control an amount of deformation of the palm portion 30 in the thickness direction than when using pressure as a drive source.

Figure 8:
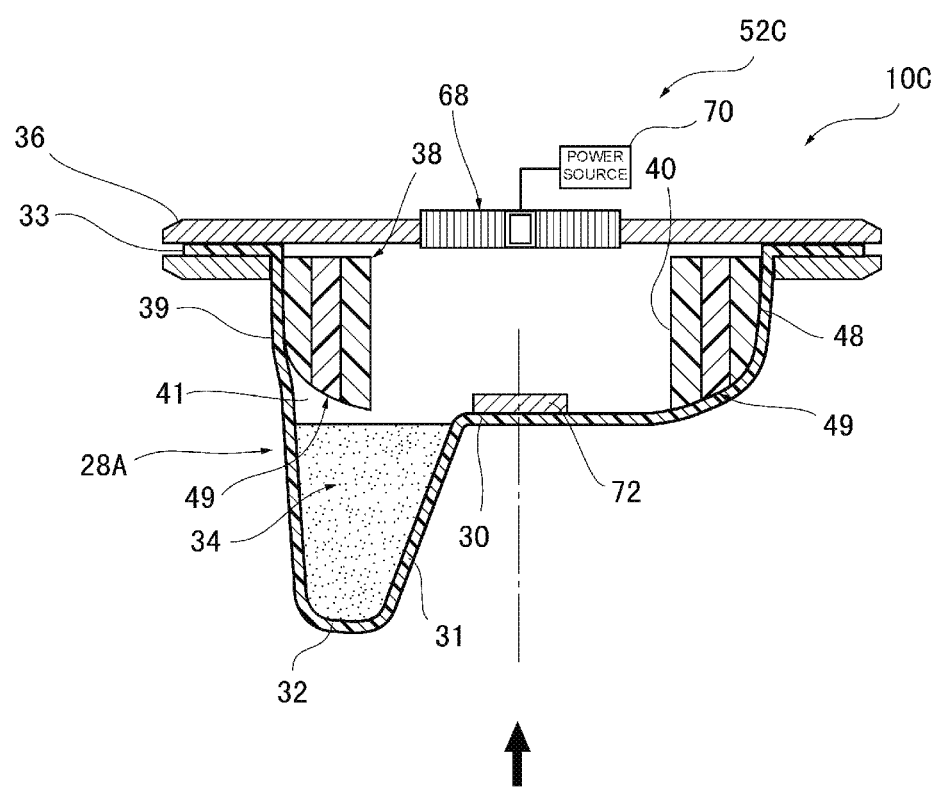
FIG. 8 is a partial end view of a configuration of a gripping device according to Modified example (2) of an actuator.
Figure 9:
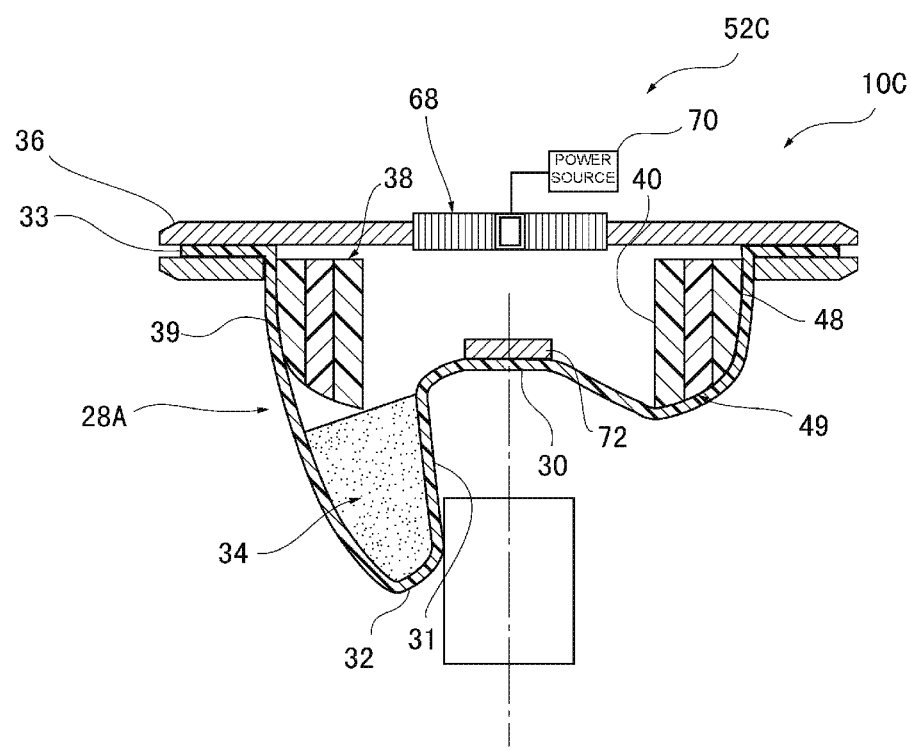
FIG. 9 is a partial end view of a use state of the gripping device according to Modified example (2) of the actuator.

A gripping device 10C in FIG. 8 includes an actuator 52C using an electromagnet 68. The actuator 52C includes an electromagnet 68 provided on the case 36, and a DC power source 70 that supplies electric power to the electromagnet 68. A support plate 72 is made of a ferromagnetic material, for example, iron. The electric power is supplied to magnetize the electromagnet 68 to generate a magnetic force. The magnetic force allows the support plate 58 to be pulled toward the electromagnet 68, allows the palm portion 30 to be deformed inward in the thickness direction, and allows the finger portions 32 to be closed (FIG. 9). On the other hand, when the supply of the electric power is stopped, the magnetic force is lost. Then, the palm portion 30 can be deformed outward in the thickness direction by its own weight to open the finger portions 32. A coil spring may be provided between the support plate 58 and the case 36. The coil spring can press the palm portion 30 outward in the thickness direction, thereby more quickly opening the finger portions 32.

The gripping device 10C uses electricity as a drive source, and thus may have the same advantage as in Modified example (1). The gripping device 10C can control electric power to be supplied to the electromagnet 68 to change an amount of deformation of the finger portions 32 and a gripping force.

(2) Other Modified Examples

The gripping body 28A may be integrated with the elastic portions 34. In this case, the gripping body 28A and the elastic portions 34 may be partially or entirely made of the same material or different materials.

In the embodiment, the high-strength portion 38 including the ring bodies 44 to 46 concentrically arranged has been described. However, the present invention is not limited thereto, but the high-strength portion 38 may include one ring body. The one ring body preferably includes an air passage. The high-strength portion 38 is not limited to the cylindrical member, but may be a polygonal prism member having the guide hole 40.

In the embodiment, the high-strength portion 38 being the cylindrical member has been described, but the present invention is not limited thereto. For example, the high-strength portion 38 may be a frame-shaped member having an oval shape, a polygonal shape, or an elliptical shape in a plan view. The high-strength portion may have any outer shape according to the shape of the gripping body. The shape of the guide hole of the high-strength portion is not limited to the circular shape, but may be a polygonal shape. The high-strength portion 38 having the holding surface 48 has been described, but the present invention is not limited thereto. The holding surface 48 may be omitted. In this case, a cylindrical case may be used so that an outer peripheral surface of the case has the function of the holding surface.

The gripping body may be made of one material or may be formed of a stack of films of a plurality of different materials. The gripping body may be partially made of a different material. The gripping body needs not have a fixed thickness, but may partially have a thick or thin portion.

2. Second Embodiment

Figure 10:
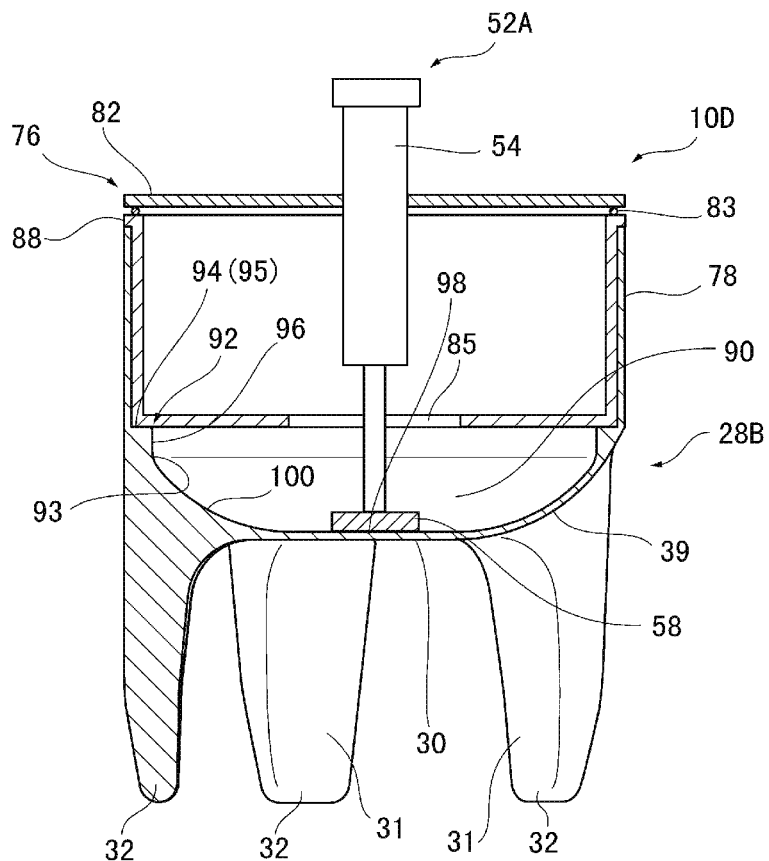
FIG. 10 is a partial end view of a configuration of a gripping device according to a second embodiment.

A gripping device according to a second embodiment is different in that the gripping device includes a gripping body including a high-strength portion integrated with the palm portion, the finger portions, and the connecting portion. The same components as those in the first embodiment are denoted by the same reference numerals and descriptions thereof are omitted. A gripping body 28B in FIG. 10 includes the palm portion 30 and the plurality of finger portions 32 provided to protrude from the periphery of the palm portion 30. Five finger portions 32 are radially provided and integrated with the palm portion 30 so as to surround the palm portion 30. A connecting portion 78 is integrally formed in a position surrounding an outer edge of the palm portion 30 on the side opposite to the side formed with the finger portions 32. The connecting portion 78 has a cylindrical shape, and has a circular opening at an upper end in FIG. 10. The gripping body 28B has the outer peripheral surface 39 curved to protrude outward from the palm portion 30 toward the connecting portion 38. The finger portions 32 are solid. A material of the finger portions 32 may be the same as or different from a material of other portions (palm portion 30 or connecting portion 78). Further, the material of the finger portions 32 needs not be always uniform but may be a composite of different materials or may contain an additive such as a filler. The opening of the gripping body 28B is sealed by a case 76.

Figure 11:
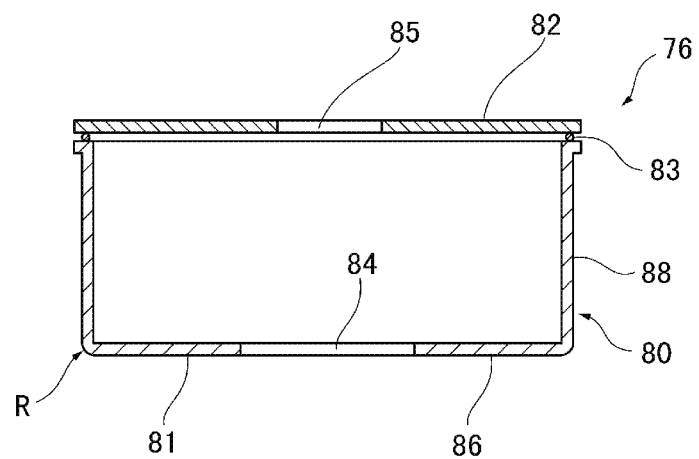
FIG. 11 is a vertical sectional view of a configuration of a case according to the second embodiment.

As shown in FIG. 11, the case 76 is preferably made of metal such as stainless, or rigid resin such as plastics, and includes a lower case 80 and an upper case 82. The lower case 80 includes a bottom 86 having a through hole 84 at the center, and a cylindrical portion 88 integrated with an outer edge of the bottom 86. An outer edge R of a bottom surface 81 as a distal end surface of the lower case 80 is chamfered. For chamfering, the outer edge of the bottom surface 81 may be cut into a corner surface or a rounded surface. Smaller chamfering is preferable to prevent local deformation of the connecting portion 78 in the thickness direction.

The lower case 80 and the upper case 82 are integrated via an O-ring 83 as a sealant at an upper end of the cylindrical portion 88. The upper case 82 has a through hole 85 at the center. The second power cylinder 52A is secured in the through hole 85.

The gripping body 28B includes, between the connecting portion 78 and the palm portion 30, a high-strength portion 92 that is less likely to be deformed in the thickness direction than the palm portion 30. The high-strength portion 92 is integrated with the palm portion 30 and the connecting portion 78. The high-strength portion 92 includes a base end 94 coming into contact with the lower case 80, and a distal end 93 apart from the base end 94 toward the finger portions 32 and connected to the palm portion 30. The high-strength portion 92 is less likely to be deformed than the palm portion 30, but is not a complete rigid body. The high-strength portion 92 is microscopically deformed at the base end 94 as a fulcrum toward the center of the palm portion 30.

The base end 94 is located apart from the outer edge of the palm portion 30 in the thickness direction of the palm portion 30, that is, in a position apart from the palm portion 30 toward the upper opening of the connecting portion 78. In the embodiment, the base end 94 has a contact surface 95 coming into contact with an outer peripheral portion of the bottom surface 81 of the case 76. The high-strength portion 92 has an inner peripheral surface 96 in contact with a guide space 90 on the center side of the palm portion 30 continuous with the contact surface 95. The palm portion 30 has, on its inner side, a substantially flat inner surface 98 and a curved surface 100 provided around the inner surface 98 and protruding outward. The inner peripheral surface 96 and the inner surface 98 of the palm portion 30 are connected by the curved surface 100. Between the bottom surface 81 of the lower case 80 and the inner surface of the palm portion 30, the guide space 90 is formed that receives the palm portion 30 deformed in the thickness direction.

The distal end 93 of the high-strength portion 92 is located between the inner peripheral surface 96 and the curved surface 100. The distal end 93 serves as a fulcrum when the palm portion 30 is deformed in the thickness direction.

Figure 12:
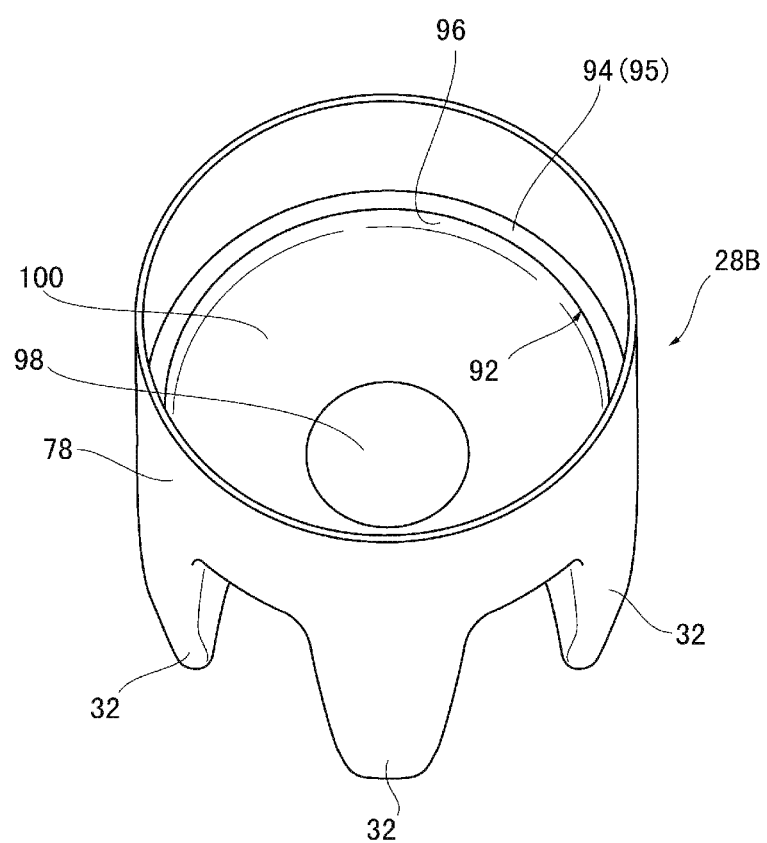
FIG. 12 is a perspective view of a configuration of a gripping body according to the second embodiment.

As shown in FIG. 12, the high-strength portion 92 is formed to surround the palm portion 30 according to the shape of the connecting portion 78. In FIG. 12, the high-strength portion 92 has an annular shape. The contact surface 95 is an upper surface of the high-strength portion 92. The outer peripheral portion of the bottom surface 81 of the case 76 comes into contact with the contact surface 95 of the high-strength portion 92.

Figure 13:
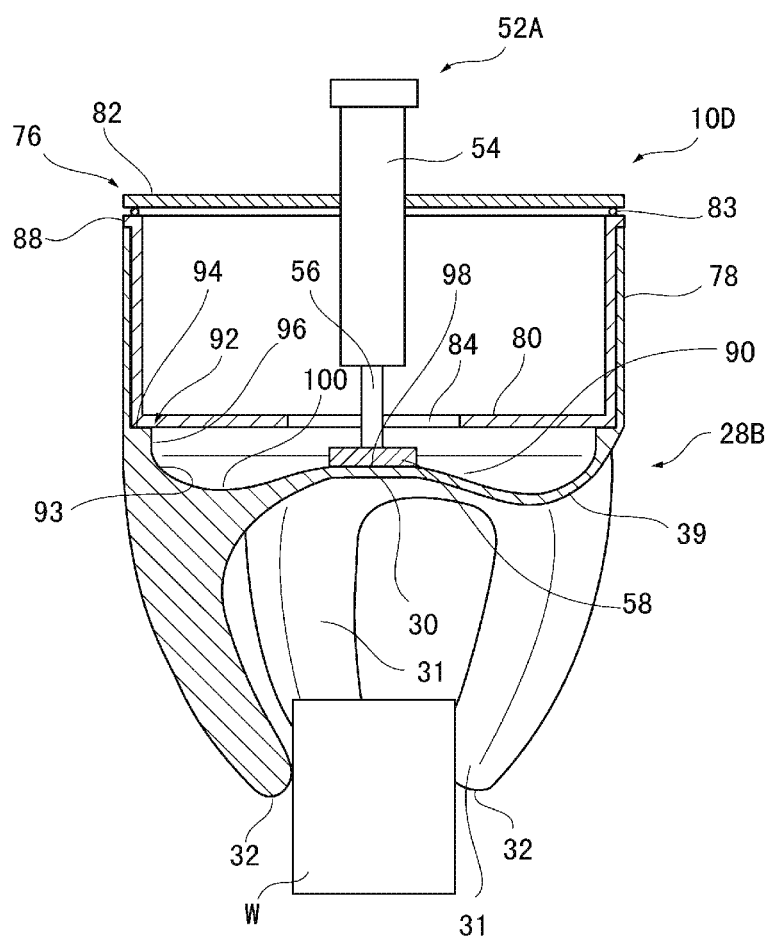
FIG. 13 is a partial end view of a use state of the gripping device according to the second embodiment.

The high-strength portion 92 is integrated with the palm portion 30 and the finger portions 32, and is microscopically deformed according to the deformation of the palm portion 30 in the thickness direction. Thus, the finger portions 32 are continuously and gently deformed according to the deformation of the palm portion 30. Thus, the gripping device 10D can softly grip the workpiece W (FIG. 13). In a gripping body without a high-strength portion 92, finger portions are deformed to be buckled.

The gripping device 10D according to the second embodiment includes the second power cylinder 52A, and thus may have the same advantage as in the first embodiment.

The gripping body 28B includes integrally the palm portion 30, the finger portions 32, the high-strength portion 92, and the connecting portion 78, thereby reducing the number of components and the number of manufacturing steps. The palm portion 30, to which a heavy load is applied when the second power cylinder 52A is contracted, and the high-strength portion 92 are integrated, thereby preventing damage to the gripping body 28B and improving durability.

The high-strength portion may include a plurality of strips provided in positions corresponding to the finger portions. The high-strength portions are arranged at regular intervals at base ends of the finger portions around the palm portion. Each of the high-strength portions has a contact surface as an upper surface and an inner peripheral surface as an inner surface on the side of the palm portion. A distal end of the high-strength portion is located between the inner peripheral surface and the curved surface. The high-strength portions in the form of strips can reduce an amount of material as compared to an annular high-strength portion, thereby reducing weight.

The high-strength portion may include a plurality of annular protrusions arranged at predetermined intervals in parallel with the thickness direction of the palm portion. An upper surface of one of the protrusions located farthest from the palm portion is a contact surface. An inner surface of each of the protrusions on the side of the palm portion is an inner peripheral surface.

The high-strength portion may include a plurality of ribs whose longitudinal direction is the thickness direction of the palm portion. The ribs are arranged at predetermined intervals around the palm portion. An upper surface of each of the ribs is a contact surface, and an inner surface of each of the ribs on the side of the palm portion is an inner peripheral surface.

The high-strength portion may be made of a material having higher mechanical strength than a material of the palm portion. The high-strength portion may be integrated with the finger portions and the palm portion by insert molding.

3. Modified Example

The present invention is not limited to the above embodiment, but may be changed as appropriate within the scope of the present invention.

In the embodiment, the orthogonal robot is exemplified as the industrial robot 12. However, the present invention is not limited to this, but may be applied to a SCARA robot, an articulated robot, or the like. Specifically, the gripping device can grip the workpiece W and keep the gripping state even if rotated around X, Y, and Z axes by the industrial robot.

The gripping device may have a claw portion on the finger portion. The claw portion may be made of a plate-like member, a conical member, or a sack-like member of synthetic resin.

The case may have a camera for taking an image of the workpiece W, a gravimeter for measuring a weight of the gripped workpiece W, a proximity sensor for measuring a distance between the workpiece W and the gripping body, or the like.

The gripping body may have a rectangular shape in a plan view. In this case, a plurality of pairs of finger portions are preferably provided on opposite sides of the palm portion along long sides of the palm portion. As the palm portion is deformed in the thickness direction, the inner surfaces of the finger portions are pulled toward the center of the palm portion. Then, the finger portions are elastically deformed to fall toward the palm portion. In this case, the finger portions are elastically deformed to fall toward the opposite long sides. Thus, the gripping device including the gripping body can easily grip a long member such as of a cylindrical shape or a prism shape.

REFERENCE SIGNS LIST 10A to 10D gripping device
12 industrial robot
28A, 28B gripping body
30 palm portion
32 finger portion
33 flange portion (connecting portion)
34 elastic portion
36 case
38, 92 high-strength portion
39 outer peripheral surface
40 guide hole
49 curved portion
52A second power cylinder (actuator)
52B actuator
52C actuator
76 case
78 connecting portion
88 cylindrical portion

The invention claimed is:

1. A gripping device comprising:
a palm portion;
a plurality of finger portions protruding from a periphery of the palm portion and configured to fall toward the palm portion by deforming the palm portion in a thickness direction;
a connecting portion formed in a position surrounding an outer edge of the palm portion on a side opposite to a side formed with the finger portions, the connecting portion connected to a case;
a high-strength portion provided between the palm portion and the connecting portion, the high-strength portion having a predetermined length from the outer edge of the palm portion in the thickness direction of the palm portion, and the high-strength portion being less likely to be deformed than the palm portion;
the case connected to the connecting portion, the case coming into contact with a base end of the high-strength portion; and
an actuator configured to deform the palm portion in the thickness direction.

2. The gripping device according to claim 1, wherein the high-strength portion is separate from the palm portion, the finger portions, and the connecting portion, the high-strength portion including a guide hole that receives the deformed palm portion, and a curved portion provided on an outer side at a distal end on a side of the finger portions in an axial direction of the guide hole.

3. The gripping device according to claim 1, wherein the palm portion, the finger portions, the connecting portion, and the high-strength portion are integrated.

4. The gripping device according to claim 1, further comprising an outer peripheral surface between the palm portion and the connecting portion, the outer peripheral surface curved to protrude outward.

5. An industrial robot comprising the gripping device according to claim 1.

* * * * *